INVENTOR.
WAYNE C. HAZEN
ANGUS V. HENRICKSON
BY

ATTORNEYS

STRIPPING OF $H_3PO_4$ FROM 20% AMINE SOLVENT WITH AQUEOUS $SO_2$

Fig. 6

STRIPPING OF $H_3PO_4$ FROM AMINE SOLVENT WITH WATER ALONE AND WATER AND $SO_2$

Fig. 3

EFFECT OF TEMPERATURE ON THE STRIPPING OF $H_3PO_4$ FROM AMINE SOLVENT WITH AQUEOUS $SO_2$

Fig. 4

STRIPPING OF $H_3PO_4$ FROM VARIOUS AMINE SOLVENTS WITH AQUEOUS $SO_2$

Fig. 5

INVENTOR.
WAYNE C. HAZEN
ANGUS V. HENRICKSON
BY
*Sheridan and Ross*

ATTORNEYS

United States Patent Office 3,333,924
Patented Aug. 1, 1967

3,333,924
RECOVERY OF ACIDS
Wayne C. Hazen, Denver, and Angus V. Henrickson, Golden, Colo., assignors, by mesne assignments, to Hazen Research, Inc., a corporation of Colorado
Filed Jan. 10, 1964, Ser. No. 336,914
14 Claims. (Cl. 23—165)

ABSTRACT OF THE DISCLOSURE

The invention relates to the recovery of sulfuric and phosphoric acids from solutions of acids by solvent extraction and comprises extracting the acids with an organic extractant, such as an amine, and stripping acid from the acid-loaded solvent with sulfur dioxide and water, the novelty being based on the stripping feature. A modification is the recovery of sulfur dioxide after stripping by adding an organic base, such as lime, to convert it to a sulphite and heating the sulfite.

---

This invention relates to a process for the recovery of acids from solutions, including such recovery from solvent extractants; more particularly, it relates to improvements in acid recovery processes utilizing solvent extraction techniques providing for regeneration and reuse of reagents including the solvent.

The invention will be illustrated principally by its application to the recovery of phosphoric and sulphuric acid; however, its application is not limited to the recovery of these acids as it is likewise applicable to the recovery of other strong acids.

Processes for the recovery of phosphoric acid from phosphate ores in which the ore is treated with sulfuric acid to form phosphoric acid are well known. When the insoluble matter is separated from the liquid phosphoric acid by filtration or decantation the impure phosphoric acid is used as fertilizer. This is the wet process phosphoric acid which is not usable for detergent, food or chemical manufacture because of the impurities such as iron, alumina, arsenic, vanadium, fluoride, etc.

High purity phosphoric acid for industrial and food uses is made by the electric furnace process and costs approximately forty dollars per ton ($P_2O_5$) more than the fertilizer acid made by the wet method. This emphasizes the importance of the availability of an economical process for the recovery and purification of this acid made by the wet process.

Methods for purification of wet process phosphoric acid by solvent extraction techniques have been proposed utilizing alcohols, esters, amines and other organic water-immiscible solvents.

In the case of acids other than phosphoric acid, such as sulfuric acid and hydrochloric acid, there are no economical processes for recovery and purification although many efforts have been made to develop such a process.

One of the chief difficulties in the use of solvent extraction processes for the recovery of acids is that of stripping the acid from the solvent. Present stripping techniques using water alone result in very dilute acid solution or an inefficient recovery of the acid. The dilute solutions require further concentration by evaporation. This is particularly true of the amine type solvents. These factors render present solvent extraction processes for recovery of acids uneconomical.

Accordingly, it is an object of this invention to provide a process for the recovery of acids from solutions which is economically feasible for commercial production of high purity acids.

It is another object of this invention to provide a process for the recovery of acids by solvent extraction in which a high purity acid is recovered and the solvent can be regenerated in a substantially pure state.

It is still another object of this invention to provide a process for the recovery of acids in which the reagents used can be regenerated and continuously recycled for use in the process.

It is a further object of this invention to provide an economical method for stripping the acid from an acid loaded extraction solvent and recovering it in a relatively pure form.

It has been found that the above and other objects can be accomplished by treating the solution containing the acid with an organic solvent in a solvent extraction process to extract the acid followed by stripping the acid from the solvent with sulfur dioxide and water, and recovering the sulfur dioxide for reuse from both the stripped solvent and the produced acid, thereby regenerating the solvent for reuse and producing a concentrated acid product. The process of the invention is not limited by the conventional extraction step but in its broadest form comprises the stripping of acid from an acid loaded solvent extractant with water and sulfur dioxide.

The invention will now be described in conjunction with the accompanying drawings in which.

The acids which are recoverable by this process are acids which are unreactive with sulfur dioxide, including phosphoric and sulfuric acid. The acids must be compatible with the solvent which is used and preferably should have a lower vapor pressure than sulfur dioxide to permit its easy removal from the acid by heat or vacuum distillation.

While the invention is not limited in its application to any particular solvent extractant, it is illustrated by examples in which amines are used as solvent extractants. When these amines are used they are ordinarily dissolved in an inert water immiscible diluent, such as, kerosene. While the secondary and tertiary amine solvent extractants can be regenerated after the stripping step by direct heat or vacuum distillation to remove sulfur dioxide, the primary amines cannot be effectively regenerated in this manner, apparently because they are too basic in reaction. However, they can be just as effectively regenerated by treating them with lime after the stripping step to remove the sulfur dioxide in the form of a precipitate of calcium sulfite which is removed and heated to regenerate both sulfur dioxide and lime, the entire procedure resulting in the regeneration of all three reagents. This procedure can, of course, be used for other extractants. Among other equivalent solvent extractants well known in the art are the lower alkyl phosphate esters, such as butyl, octyl, tri-butyl and tri-octyl phosphates and others disclosed as solvents in U.S. Patent 2,955,918, lower aliphatic alcohols and ketones as disclosed in the combination of U.S. Patents 1,929,441; 1,929,452; 1,981,145 and 2,880,063, and others well known in the art.

When amines are used as solvent extractants, those preferred are the alkyl substituted amines in which the alkyl substituents have six or more carbon atoms in the chain, including branched chain alkyl radicals. Examples are tri-lauryl amine which is a tertiary $C_{12}$ straight chain amine, tri-caprylyl amine, a tertiary amine, di-lauryl amine, a secondary straight chain amine, do-decenyl-tri alkyl methyl amine, a homologous mixture containing 24–27 carbon atoms, a secondary amine, and tri-alkyl methyl amine, a homologous mixture containing 18–24 carbon atoms, a primary amine.

The preferred stripping agent is water and sulfur dioxide. This combination, of course, forms sulfurous acid. The surprising discovery has been made that this gas in the presence of water will strip acids, such as, sulphuric and phosphoric, from solvents, and meets other requirements for the stripping agent, including that of being unreactive with the acid and the solvent. It can be separated from the acid and a majority of solvent extractants by direct heat or vacuum distillation. Sulfur dioxide is a volatile acid anhydride gas which is compatible and unreactive with strong acids and solvents used for solvent extraction of acids.

While the reason for the surprising and unexpected effectiveness of sulfur dioxide in the presence of water for stripping acids from solvents has not been determined with certainty, it may be postulated that the effectiveness of sulfur dioxide or the sulfurous acid formed for stripping acids from solvent is due to the competitive effect produced on the solvent-acid bond. In such cases where the acid is bonded to the solvent through some mechanism such as hydrogen bonding, then the sulfurous acid (sulfur dioxide plus water) will compete with the extracted acid for the solvent bond. This, therefore, would effectively loosen the attachment of the extracted acid to the solvent and permit the ready removal in a concentrated form by water stripping. If the vapor pressure of the sulfurous acid remaining on the solvent after removal of the extracted acid is high enough to permit its removal by heat or vacuum, then the solvent can be regenerated for reuse. This extends the usefulness of the sulfur dioxide stripping technique, therefore, to classes of solvents which extract acids where the attachment may be through some mechanism such as hydrogen bonding. Examples of these solvents are lower alkyl phosphate esters such as butyl and octyl phosphate tri-butyl and tri-octyl phosphate, lower aliphatic alcohols such as butyl and amyl alcohol, ketone and other conventional solvent extractants for acids. Such solvents are known to extract phosphoric acid and it follows that the sulfur dioxide and water stripping should be effective with these solvents as well as with amines.

While the temperature at which the acid may be stripped from the solvent with sulfur dioxide and water is not critical, it has been found that a temperature of about 25° C. or below is preferable. It is preferred that sulfur dioxide be used to the saturation point. The method of removing sulfur dioxide from the acid and solvent is not critical. Direct heat and vacuum distillation are acceptable for secondary and tertiary amines and other solvents while the lime treatment described above is acceptable in the case of primary amines and other solvents of the type mentioned herein.

The following examples are included to illustrate the invention but they are in no way limiting thereof.

The extraction and stripping procedures used in the examples simulate conventional commercial procedures. The examples illustrate that the process is adaptable to such procedures.

Example 1 was performed to illustrate the effectiveness of a typical amine for solvent extraction of phosphoric acid.

*Example 1.—Extraction of $H_3PO_4$ with tri-caprylyl amine solvent*

(1.1) *Solvent Composition:*

| | Percent (v./v.) |
|---|---|
| Tri-caprylyl amine | 10 |
| Isodecanol | 10 |
| Kerosene | 80 |

(1.2) *Test procedure.*—100 ml. of the solvent was contacted with 30 ml. 50% (w./w.) $H_3PO_4$ by vigorous shaking in a separatory funnel at 25° C. The phases were then allowed to separate. 5 ml. of the aqueous phase was removed for $H_3PO_4$ analysis. The entire solvent phase was stripped with an equal volume of 5% $Na_2CO_3$ solution. This strip solution was separated for $PO_4^\equiv$ analysis and the solvent was washed twice with water and recontacted with the remaining 25 ml. of $H_3PO_4$ solution from the first contact. This procedure was repeated through four stages of extraction.

One separate contact was made between 100 ml. solvent and 2 volumes of 50 ml. 50% (w./w.) $H_3PO_4$ to determine the distribution at higher solvent loading.

(1.3) *Data.*—The analysis of each of the aqueous and solvent phases are given in Table 1.

TABLE 1.—EXTRACTION OF $H_3PO_4$ WITH 10% (V./V.) TRI-CAPRYLYL AMINE, 10% (V./V.) ISODECANOL, IN KEROSENE

| Stage | Concentration of $H_3PO_4$ (gm./l.) | |
|---|---|---|
| | Organic phase | Aqueous phase |
| 1 | 45.0 | 592 |
| 2 | 35.2 | 453 |
| 3 | 31.6 | 349 |
| 4 | 26.5 | 214 |
| 5 | 15.9 | 580 |

Figure 1:
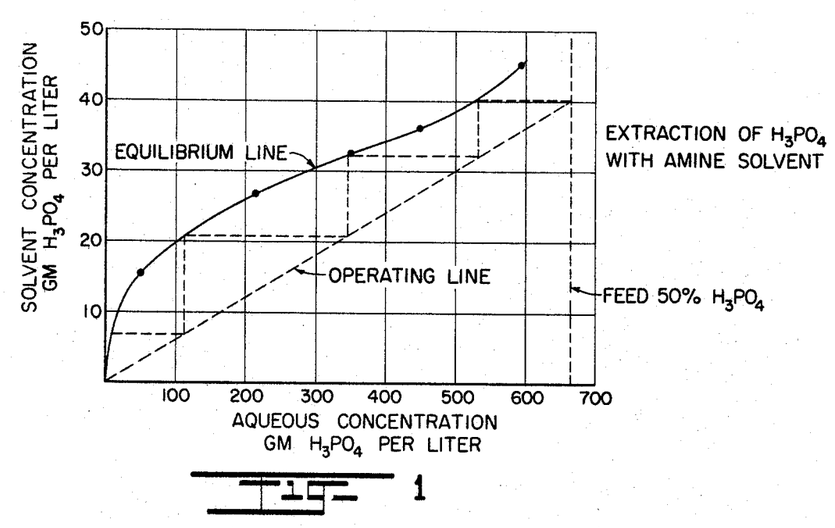
FIG. 1 is a graph presenting the data of Example 1 as an extraction isotherm and showing the effectiveness of amine solvent as an extraction agent for phosphoric acid.

The results of the example are plotted in the graph of FIG. 1. They show, for example, that for an aqueous concentration of about 600 grams per liter of $H_3PO_4$ a solvent concentration of about 44 grams of $H_3PO_4$ per liter results. This illustrates that the solvent is highly effective for extracting phosphoric acid. In fact it shows that in a four stage counter current system approximately 99% of the phosphoric acid would be extracted into the solvent.

Example 2 is included for the purpose of illustrating the effectiveness of aqueous sulfur dioxide as a stripping agent for stripping phosphoric acid from tri-caprylyl amine.

Example 2.—Stripping of $H_3PO_4$ from tri-caprylyl amine solvent with aqueous $SO_2$ (2.1) *Solvent composition:*

|   | Percent (v./v.) |
|---|---|
| Tri-caprylyl amine | 10 |
| Isodecanol | 10 |
| Kerosene | 80 |

(2.2) *Test procedure.*—100 ml. of the solvent was loaded with $H_3PO_4$ by contacting twice with 50 ml. samples of 50% (w./w.) $H_3PO_4$ at 25° C. in a separatory funnel. Residual phosphoric acid was removed after the second contact by centrifuging so that a clear loaded solvent was obtained. The $H_3PO_4$ was stripped from the solvent by adding 5 ml. distilled water and then saturating the aqueous acid solvent with $SO_2$ at 25° C. The mixture was agitated intermittently to assure equilibrium between the phases. Phases were then permitted to separate and were analyzed for $H_3PO_4$. This stripping procedure was repeated five times to determine the distribution in a range of $H_3PO_4$ concentrations.

(2.3) *Data.*—The analysis of the aqueous $H_2SO_3$ strips and the corresponding solvents are given in Table 2. The stripping isotherm is given in FIG. 2.

TABLE 2.—STRIPPING OF $H_3PO_4$ WITH $SO_2$ AND WATER FROM 10% (V./V.) TRI-CAPRYLYL AMINE, 10% ISODECANOL IN KEROSENE

| Concentration of $H_3PO_4$ (gm./l.) | |
|---|---|
| Organic phase | Aqueous phase |
| 25.9 | 618 |
| 9.1 | 441 |
| 0.60 | 206 |
| <.03 | 6.0 |
| Nil | 0.81 |

Figure 2:
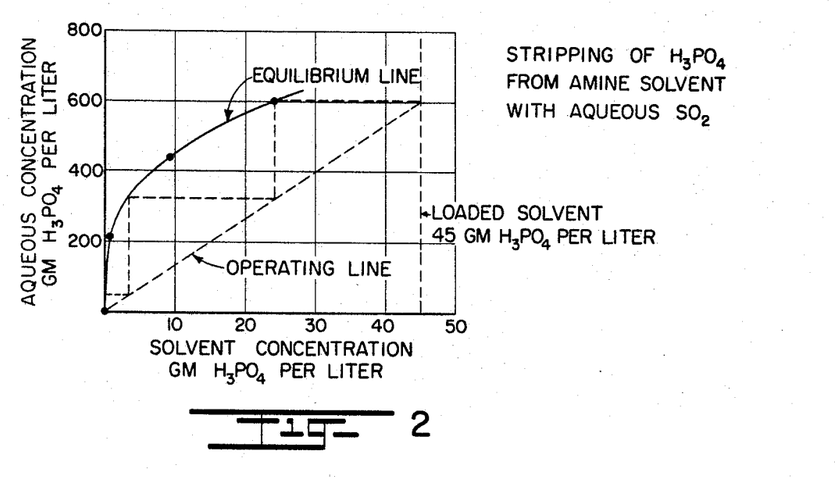
FIG. 2 is a graph of stripping isotherms based on the stripping of acid from amine solvent with water and $SO_2$ and in which acid in the organic phase is plotted against acid in the aqueous strip phase.

The results are plotted in the graph of FIG. 2. The graph shows, for example, that a strip solution containing more than 600 grams of phosphoric acid per liter in the aqueous phase can be obtained by the use of the sulfur dioxide-water stripping process. In addition, it shows that the solvent can be completely stripped of its extracted phosphoric acid by three stages of counter current operation.

Example 3 is a control showing the ineffectiveness of water alone for stripping phosphoric acid from tricaprylyl amine solvent.

Example 3.—Stripping of $H_3PO_4$ from tri-caprylyl amine solvent with water (3.1) *Solvent composition:*

|   | Percent (v./v.) |
|---|---|
| Tri-caprylyl amine | 10 |
| Isodecanol | 10 |
| Kerosene | 80 |

(3.2) *Test procedure.*—100 ml. of the solvent was loaded with $H_3PO_4$ by shaking twice with 50% (w./w.) $H_3PO_4$ solution at 25° C. in a separatory funnel. Residual $H_3PO_4$ was removed after the second contact by centrifuging so that a clear solvent was obtained.

The $H_3PO_4$ was then stripped by adding 5 ml. water and shaking vigorously in a separatory funnel. The phases were then separated and analyzed for $H_3PO_4$. Four consecutive strips were made in this manner.

(3.3) *Data.*—The analysis of the aqueous strips and the corresponding solvents are given in Table 3. The stripping isotherm is given in FIG. 3. The stripping isotherm for aqueous $SO_2$ is included in FIG. 3 for ease of comparison.

TABLE 3.—STRIPPING OF $H_3PO_4$ FROM 10% (V./V.) TRI-CAPRYLYL AMINE, 10% (V./V.) ISODECANOL IN KEROSENE WITH WATER AT 25° C.

| Concentration of $H_3PO_4$ (gm./l.) | |
|---|---|
| Organic phase | Aqueous phase |
| 22.8 | 274 |
| 16.8 | 109 |
| 14.1 | 52 |
| 12.5 | 32 |

Figure 3:
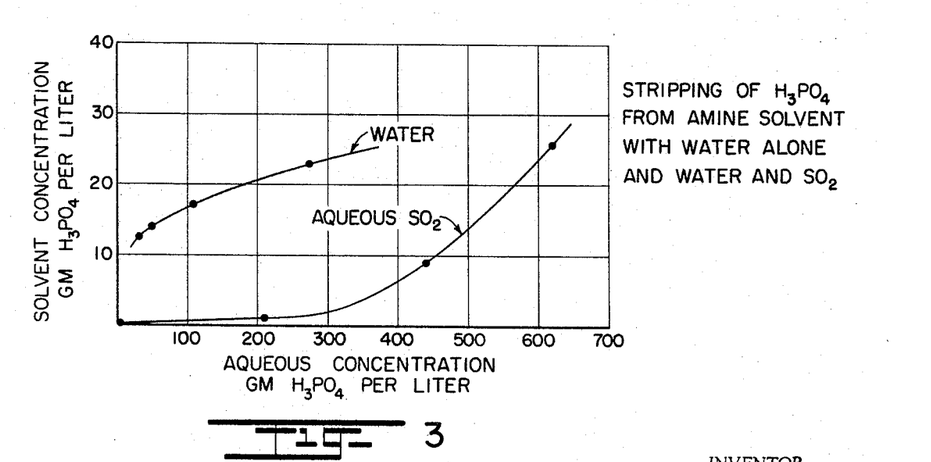
FIG. 3 is a graph plotted similarly to FIG. 2 of the results of an example using water alone as the stripping agent for stripping acid from an amine solvent and showing the graph of FIG. 2 for comparative purposes.

The results of Example 3 are plotted in FIG. 3 along with the plot of FIG. 2 for comparative purposes. The effectiveness of aqueous $SO_2$ over water alone as a stripping agent is illustrated by the fact that with the use of aqueous $SO_2$ an aqueous concentration of more than 600 grams of phosphoric acid per liter was obtained whereas without the $SO_2$ the maximum concentration obtained was 275 grams of phosphoric acid per liter. In addition, with water alone more than 10 grams of phosphoric acid per liter remained in the solvent after stripping whereas with aqueous $SO_2$ the stripping of phosphoric acid from the solvent was substantially complete. This graphically illustrates the effectiveness of aqueous sulfur dioxide as a stripping agent.

Example 4 records the results of experiments made to determine the effect of temperature on stripping phosphoric acid from tri-caprylyl amine solvent with aqueous sulfur dioxide.

Example 4.—Effect of temperature on the stripping of $H_3PO_4$ from 10% (v./v.) tri-caprylyl amine, 10% (v./v.) isodecanol in kerosene with aqueous $SO_2$ (4.1) *Solvent composition:*

|   | Percent (v./v.) |
|---|---|
| Tri-caprylyl amine | 10 |
| Isodecanol | 10 |
| Kerosene | 80 |

(4.2) *Test procedure.*—100 ml. solvent was contacted twice with 50% $H_3PO_4$ by vigorous shaking in a separatory funnel at 25% C. The aqueous phases were separated and the residual $H_3PO_4$ removed after the second contact by centrifuging so that a clear solvent was obtained.

5 ml. water was then added to the solvent and the mixture heated or cooled to the desired temperature by placing in a controlled temperature water bath. $SO_2$ was bubbled through the mixture until both the water and the solvent were saturated. The mixture was agitated intermittently to assure equilibrium between the phases. At saturation the phases were separated and analyzed for $H_3PO_4$. This stripping procedure was repeated three times.

(4.3) *Data.*—The analysis of the aqueous strips and the corresponding solvents are given in Table 4. The stripping isotherms are given in FIG. 4.

TABLE 4.—EFFECT OF TEMPERATURE ON STRIPPING OF $H_3PO_4$ WITH AQUEOUS $SO_2$ FROM 10% (V./V.) TRI-CAPRYLYL AMINE, 10% (V./V.) ISODECANOL IN KEROSENE

| Concentration of $H_3PO_4$ (gm./l.) | | | | | |
|---|---|---|---|---|---|
| 10° C. | | 25° C. | | 50° C. | |
| Organic | Aqueous | Organic | Aqueous | Organic | Aqueous |
| 20.0 | 611 | 25.9 | 618 | 33.6 | 579 |
| 7.6 | 502 | 9.1 | 441 | 11.1 | 353 |
| 2.0 | 248 | 0.60 | 206 | 6.1 | 210 |
|  |  | <.03 | 6.0 |  |  |

Figure 4:
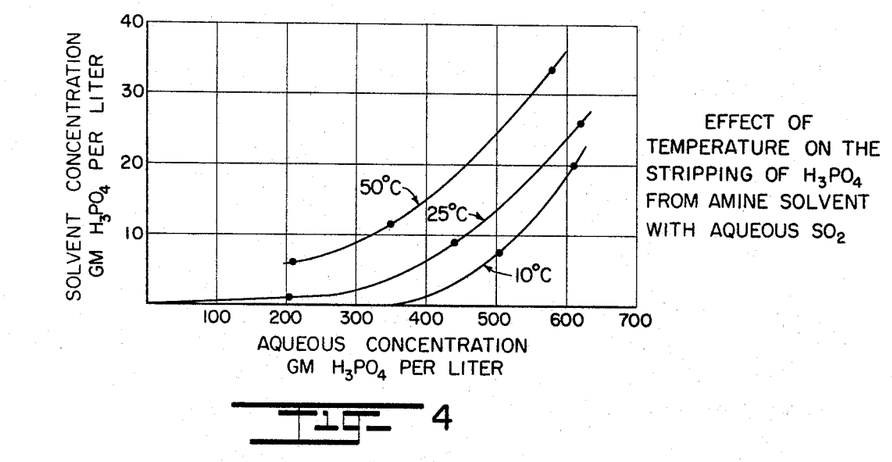
FIG. 4 is a graph plotted similarly to FIG. 2 showing the effect of temperature on stripping acid from an amine solvent with sulfur dioxide and water.

The results of Example 4 are plotted on the graph of FIG. 4. The graph illustrates that of the temperatures tested the most effective temperature is 10° C. and the least effective is 50° C., indicating that at higher temperatures the process is less effective. Of course, the temperature must always be maintained below that at which sulfur dioxide boils off.

Example 5 was performed on a synthetic wet process phosphoric acid to which had been added certain impurities ordinarily encountered in the wet process for the recovery of phosphoric acid. These impurities are set forth in the example.

*Example 5.—Extraction of $H_3PO_4$ from Synthetic Wet Process Phosphoric Acid, Distribution of $SO_4^=$, $F^-$ and $R_2O_3$*

(5.1) *Solvent (a):*

| | Percent (v./v.) |
|---|---|
| Tri-caprylyl amine | 10 |
| Isodecanol | 10 |
| Kerosene | 80 |

*Solvent (b):*

| | |
|---|---|
| Tri-caprylyl amine | 10 |
| Aromatic petroleum fractions | 90 |

(5.2) *Synthetic wet process acid:*

| | gm./l. |
|---|---|
| $H_3PO_4$ | 657 |
| $SO_4^=$ | 106 |
| $F^-$ | 19.9 |
| $R_2O_3$* | 93.3 |
| Fe | 10 |

* Symbol indicates hydroxides of Fe, Al, Cr.

(5.3) *Test procedure.*—200 ml. solvent was contacted twice with 50 ml. synthetic wet process acid by shaking in a separatory funnel. The loaded organic was centrifuged to remove entrained phosphoric acid and then stripped three times with 25 ml. water and saturation with $SO_2$ at 25° C.

Raffinates 1 and 2 and the three strip solutions were analyzed for $H_3PO_4$, $SO_4^=$, $F^-$, and $R_2O_3$.

(5.4) *Data.*—The analyses of the raffinates and strip solutions are given in Tables 5 and 5.1.

TABLE 5.—EXTRACTION OF $H_3PO_4$ FROM SYNTHETIC WET PROCESS ACID WITH 10% (V./V.) TRI-CAPRYLYL AMINE, 10% (V./V.) ISODECANOL IN KEROSENE, STRIPPING WITH AQUEOUS $SO_2$ AT 25° C. DISTRIBUTION OF $H_3PO_4$. $SO_4^=$, $F^-$ AND $R_2O_3$

| | Concentration (gm. l.) | | | | |
|---|---|---|---|---|---|
| | $H_3PO_4$ | $SO_4$ | $F^-$ | $R_2O_3$ | Fe |
| Head Solution (50 ml.) | 657 | 106 | 19.9 | 93.3 | 10.0 |
| Raffinate No. 1 (50 ml.) | 608 | 53 | 20.0 | 100.6 | 10.6 |
| Raffinate No. 2 (50 ml.) | 652 | 96 | 20.1 | 93.3 | 10.3 |
| Strip No. 1 (25 ml.) | 103 | 51 | <.05 | Trace | |
| Strip No. 2 (25 ml) | 28 | 30 | | Trace | |
| Strip No. 3 (25 ml.) | 4 | 18 | | N.D. | |
| Strip No. 4 (25 ml.) | <.05 | 35 | | N.D. | |

TABLE 5.1—EXTRACTION OF $H_3PO_4$ WITH 10% (V./V.) TRI-CAPRYLYL AMINE, 90% SOLVENT (NO ISODECANOL) FROM SYNTHETIC WET PROCESS ACID. STRIPPING WITH AQUEOUS $SO_2$ AT 25° C. DISTRIBUTION OF $H_3PO_4$, $SO_4^=$, $F^-$, AND $R_2O_3$

| | Concentration (gm./l.) | | | | |
|---|---|---|---|---|---|
| | $H_3PO_4$ | $SO_4^=$ | $F^-$ | $R_2O_3$ | Fe |
| Head Solution | 657 | 106 | 19.9 | 93.3 | 10.0 |
| Raffinate No. 1 | 635 | 51.2 | | 91.0 | 10.4 |
| Raffinate No. 2 | 648 | 92.6 | | 84.4 | 9.93 |
| Strip No. 1 | 81 | 41.2 | | 6.8 | |
| Strip No. 2 | 6 | 20.8 | | N.D. | |
| Strip No. 3 | 0.94 | 13.6 | | N.D. | |
| Strip No. 4 (NaOH) | 0.09 | 16.0 | | N.D. | |

The example shows that the only impurity picked up in appreciable amounts by the solvent and by the sulfur dioxide is the sulphate and that the amounts carried over in each are not prohibitive.

Example 6 was performed to illustrate the effectiveness of regeneration of various amine solvents saturated with $SO_2$ by heating under vacuum or by steam distillation.

*Example 6.—Regeneration of solvent by heat or steam distillation after aqueous $SO_2$ stripping*

(6.1) *General procedure.*—Two general procedures were used to regenerate tri-caprylyl solvent which had been saturated with $SO_2$:

(a) Heating on a steam bath to 75° C. for one-half hour with a gentle stream of air bubbling through the solvent. No water present.

(b) Heating on a steam bath at 15–20″ vacuum with an equal volume of water with a gentle stream of air passing through the water-solvent mixture. Heating continues until approximately one-half the water had been distilled off.

Both procedures were effective in removing the $SO_2$ and regenerating the solvent to 80% free amine.

Effectiveness of the regeneration was checked by two methods:

(a) Stripping a portion of the solvent with NaOH and titrating the acidified strip for $SO_2$ with standard iodine solution.

(b) Titrating a sample of the solvent directly with standard sodium hydroxide solution to the phenolphthalein end point and titrating a similar sample after acidifying and washing. The degree of regeneration can then be calculated from the difference between the two titres.

(6.2) *Data.*—Regeneration tests by steam distillation were made on a variety of amine solvents. The degree of regeneration was determined by titration. These results are given in Table 6.

TABLE 6.—REGENERATION OF SO₂ SATURATED SOLVENTS BY STEAM DISTILLATION

| Solvent | Calculated Normality | | |
|---|---|---|---|
| | Regenerated Solvent | Acid | Percent Regeneration |
| 10% tri-caprylyl amine | 0.04 | 0.20 | 80 |
| 10% tri-lauryl amine | 0.03 | 0.20 | 85 |
| 10% di-lauryl amine | 0.03 | 0.08 | 62 |
| 10% do-decenyl-tri-alkyl methyl amine | 0.03 | 0.18 | 83 |
| 10% tri-alkyl methyl amine* | 0.22 | 0.24 | 0 |

*Homologous mixture containing 18-24 carbon atoms—primary amine.

The results illustrate that SO₂ can be effectively removed from the secondary and tertiary amines by direct heat or vacuum distillation. This is a decided advantage of the process when these amines and many other solvents are used as extractants in that it provides a purified solvent and permits reuse of the sulfur dioxide.

Example 7 was performed to show the effectiveness of aqueous sulfur dioxide in stripping phosphoric acid from various amine solvents. The amines used were primary, secondary and tertiary amines.

*Example 7.—Extraction of H₃PO₄ and stripping with aqueous SO₂ (tests made on various amines)*

(7.1) *General procedure.*—In each test a sample of the solvent was loaded with H₃PO₄ by contacting 100 ml. of the solvent twice with 50% (w./w.) H₃PO₄. The H₃PO₄ was then stripped at 25° C. by adding water and saturating with SO₂. Three or more strips were made in this manner and finally the solvent was stripped with sodium hydroxide to determine the residual H₃PO₄ remaining in the solvent. Each aqueous strip was analyzed for H₃PO₄.

(7.2) *Data.*—Table 7 gives the concentration of H₃PO₄ found in the aqueous and organic phases in each of the tests. Stripping isotherms for each of the solvents are given in FIG. 5. Data previously given in section 2 for the tri-caprylyl amine is repeated for easier comparisons.

Figure 5:
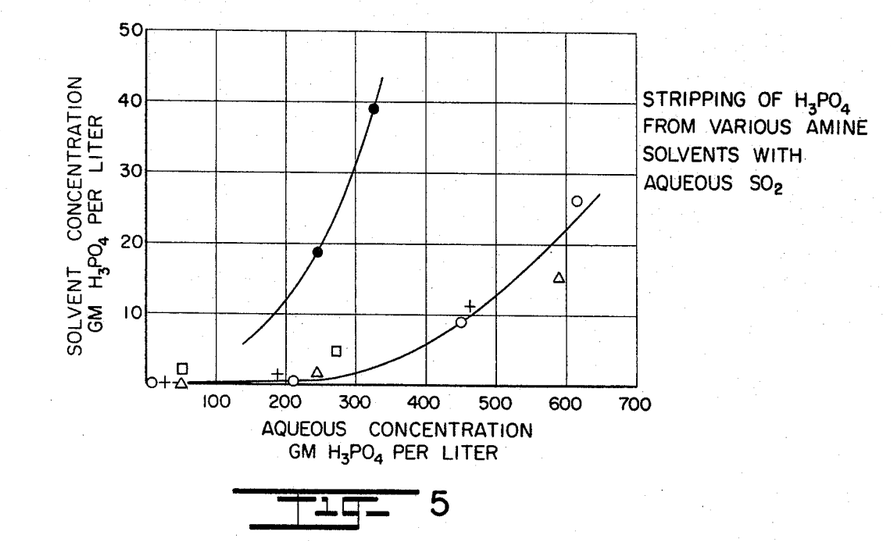
FIG. 5 is a graph plotted similarly to that of FIG. 2 showing the effectiveness of sulfur dioxide and water in stripping acid from various amine solvents.

○ Tri-caprylyl amine
△ Tri-lauryl amine
□ Di-lauryl amine
+ Do-decenyl-tri alkyl methyl amine
· Tri-alkyl methyl amine, homologous mixture 18–24 carbon atoms, primary amine The results show that phosphoric acid cannot be as effectively stripped from a primary amine solvent as it can be from the secondary and tertiary amine solvents.

Example 8 is similar to Example 2 except that 20 percent of the amine was used in the solvent.

*Example 8.—Stripping of H₃PO₄ from 20% (v./v.) tri-caprylyl amine, 20% (v./v.) isodecanol with aqueous SO₂*

(8.1) *Procedure.*—100 ml. solvent was loaded with H₃PO₄ by contacting twice with 50% H₃PO₄ by vigorous shaking in a separatory funnel at 25° C. After separation of phases the solvent was stripped by four stages of contact with 5 ml. water and saturated with SO₂. A final strip was made with NaOH to determine residual H₃PO₄ in the solvent.

(8.2) *Data.*—The concentration of H₃PO₄ in each of the aqueous and organic phases is given in Table 8. The stripping isotherm is plotted in FIGURE 6.

TABLE 8.—STRIPPING OF H₃PO₄ FROM 20% (V./V.) TRI-CAPRYLYL AMINE, 20% (V./V.) ISODECANOL IN KEROSENE AT 25° C.

| Stage | Gm. H₃PO₄/l. | |
|---|---|---|
| | Aqueous | Solvent |
| 1 | 566 | 59 |
| 2 | 402 | 33 |
| 3 | 270 | 17 |
| 4 | 186 | 7 |

Figure 6:
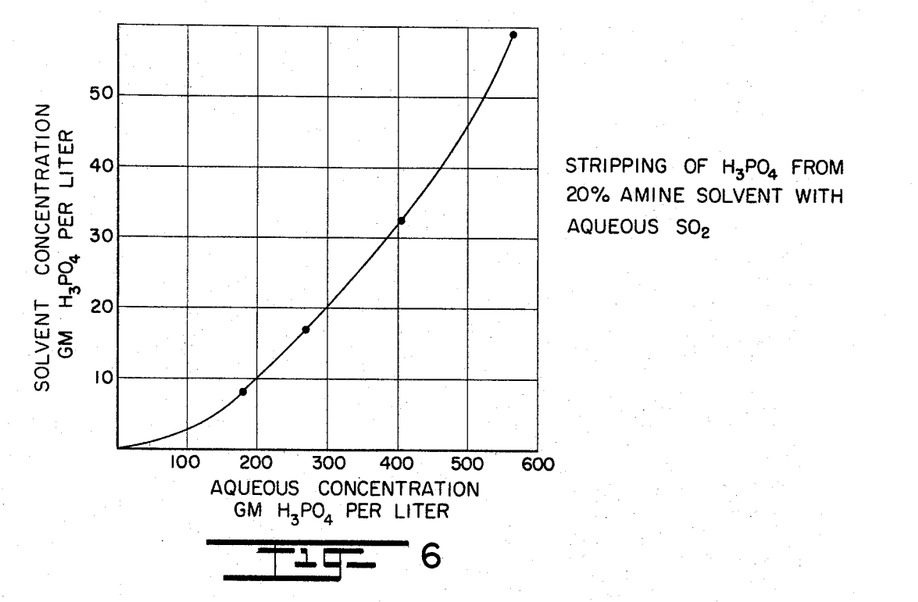
FIG. 6 is a graph plotted similarly to that of FIG. 2 showing the effectiveness of $SO_2$ and water in stripping acid from a 20 percent amine solvent.

It will be seen from the results of Example 8 as plotted in the graph of FIG. 6 that acid can be effectively stripped from 20 percent amine by the process.

TABLE 7.—EXTRACTION OF H₃PO₄ AND STRIPPING WITH AQUEOUS SO₂ AT 25° C. COMPARISON OF TERTIARY, SECONDARY AND PRIMARY AMINES. (AMINE CONCENTRATIONS EXPRESSED IN VOLUME PERCENT. ALL SOLVENTS MODIFIED WITH AN EQUAL VOLUME PERCENT OF ISODECANOL)

| Solvent | Stage | Organic | Gm. H₃PO₄/l. | |
|---|---|---|---|---|
| | | | Aqueous | Solvent Loading (gm./l.) |
| Tri-caprylyl amine 10% | 1 | 25.9 | 618 | |
| | 2 | 9.1 | 441 | ○ |
| | 3 | 0.60 | 206 | |
| | 4 | <.03 | 6.0 | 36 |
| Tri-lauryl amine 10% | 1 | 15.7 | 58.9 | |
| | 2 | 2.8 | 235 | △ |
| | 3 | 0.5 | 42 | |
| Di-lauryl amine | 1 | 4.2 | 275 | □ |
| | 2 | 1.8 | 47 | |
| | 3 | .005 | 26 | 25 |
| Do-decenyl-tri-alkyl methyl amine 10% | 1 | 11.5 | 476 | |
| | 2 | 1.2 | 187 | + |
| | 3 | 0.2 | 22 | 49 |
| Tri-alkyl methyl amine 10% | 1 | 102 | 510 | |
| | 2 | 68 | 413 | |
| | 3 | 39 | 328 | |
| | 4 | 19 | 245 | 136 |

The results of Example 7 are plotted in the graph of FIG. 5. The key to the symbols used on the graph are as follows:

Example 9 was performed to test the effectiveness of aqueous sulfur dioxide for stripping sulfuric acid from amine solvents.

Example 9.—Extraction with tri-caprylyl amine and subsequent stripping of sulfuric acid with water alone and with water and sulfur dioxide A solution of sulfuric acid containing 100 grams of sulfuric acid per liter of solution was agitated with ten times its volume of a solvent composed of 10 volume percent tri-caprylyl amine dissolved in kerosene. This mixture was agitated for three minutes, after which the phases were allowed to separate. Analysis of the aqueous phase showed that 98 percent of the sulfuric acid had been extracted by the solvent.

This solvent was divided into two portions. One portion was agitated with successive batches of water alone. The aqueous and organic layers were analyzed with the results shown in the graph of FIG. 7. The other portion was agitated with successive batches of water, and sulfur dioxide bubbled through the mixture while it was agitated for five minutes. After each agitation the phases were separated, the excess sulfur dioxide driven from each phase by boiling, and the solutions analyzed for sulfuric acid.

Figure 7:
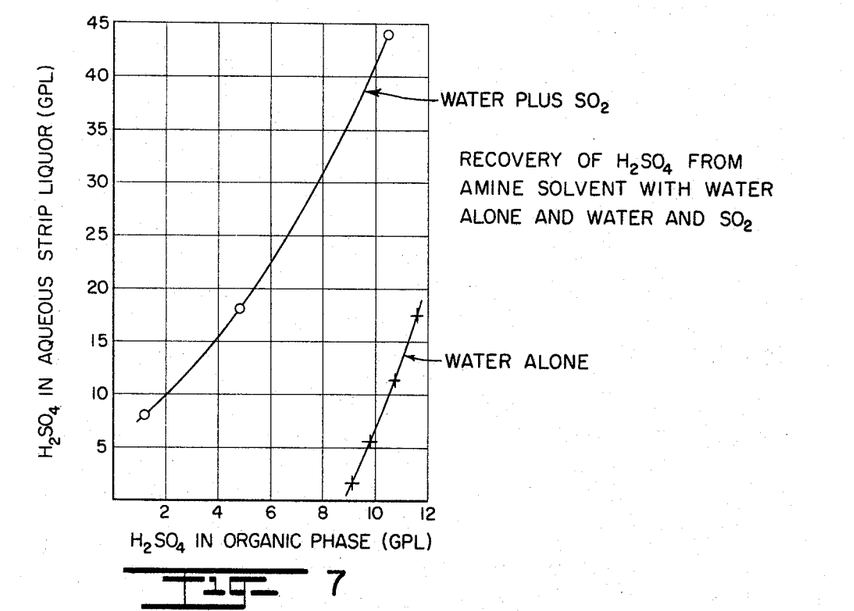
FIG. 7 is a graph plotted similarly to that of FIG. 2 showing the effectiveness of water alone and water and sulfur dioxide in stripping sulfuric acid from an amine solvent.

The results are shown in the graph of FIG. 7 which clearly demonstrates the enhanced stripping obtained with the sulfur dioxide and water. It can be seen that with water alone stripping of the solvent was very inefficient, whereas with the sulfur dioxide and water not only was the aqueous strip liquor much more concentrated, but the solvent was virtually completely stripped of sulfuric acid content.

Figure 8:
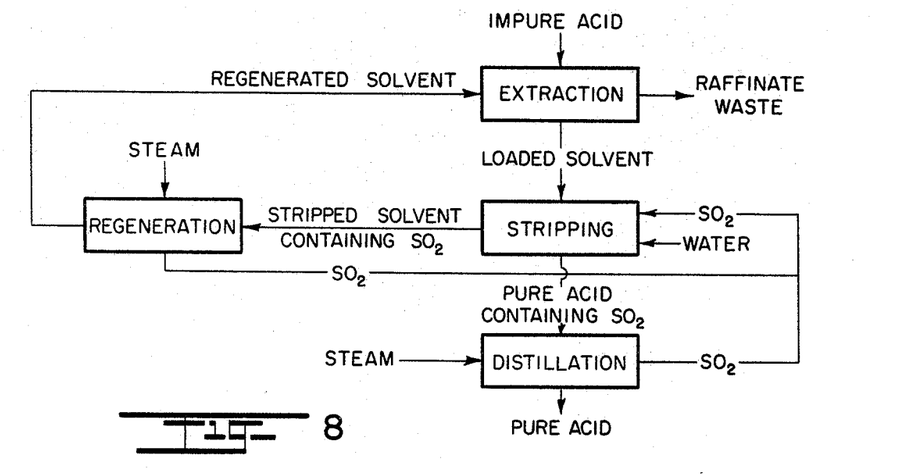
FIG. 8 is a flow diagram showing the adaptation of the process to a continuous circuit.

The flow diagram of FIG. 8 illustrates how the process is adaptable to a continous circuit. Acid in the loaded solvent from the extraction step is stripped with $SO_2$. The solvent is heated to remove $SO_2$ and returned to the extraction circuit and the $SO_2$ returned to the stripping circuit. The stripped acid is heated to remove $SO_2$ in the final recovery step and the $SO_2$ returned to the stripping circuit.

The stripping feature of the invention is not particularly dependent upon the solvent extractant used as it resides in the stripping of acid from an acid loaded solvent extractant with sulfur dioxide and water, thus being adaptable to any solvent which will extract the acid.

It is seen from the above examples that sulfur dioxide and water are highly effective for stripping acids from solvent extractants, that sulfur dioxide can be regenerated from solvents and from the acid after stripping so effectively that both it and the solvent can be reused, that its use is not dependent upon critical temperature limitations, that it can be recovered from the solvents by steam or vacuum distillation or other methods, and that it is effective with water in the presence of impurities ordinarily present with the acids. These advantages illustrate that the process is sufficiently economical for commercial adaptation.

A distinct advantage of the process resides in its economic attractiveness. It makes available for use as a stripping agent the relatively inexpensive compound, sulfur dioxide. A further contribution to the economy of the process is the fact that sulfur dioxide can be recovered so effectively after stripping of the acid that it and the solvent can be reused in a continuous process.

Although the invention has been illustrated and described with reference to the preferred embodiments thereof, it is to be understood that it is in no way limited to the details of such embodiments, but is capable of numerous modifications within the scope of the appended claims.

What is claimed is:

1. In a process for the recovery of an acid selected from the group consisting of sulfuric and phosphoric acids from solutions thereof comprising the steps of:
   extracting said acid from said solution with a substantially water immiscible organic extractant medium, and stripping said acid from said extractant with a stripping agent;
   the improvement in which said stripping comprises:
      using a stripping agent comprising water containing sulfur dioxide in at least an amount substantially approaching that required to saturate the water at about 50° C.

2. The process of claim 1 in which an inorganic base capable of forming an insoluble sulfite is added to the organic extractant after stripping to recover sulfur dioxide as a sulfite and said sulfite is heated to regenerate sulfur dioxide.

3. The process of claim 2 in which the base is lime.

4. The process of claim 1 in which the sulfur dioxide is recovered from the stripped organic extractant by heat.

5. The process of claim 4 in which the organic extractant is selected from the group consisting of secondary and tertiary amines.

6. The process of claim 1 in which the organic extractant is selected from the group consisting of amines, lower aliphatic alcohols, lower aliphatic ketones, and lower aliphatic phosphate esters.

7. The process of claim 6 in which the organic extractant is an amine having more than five carbon atoms in the chain.

8. The process of claim 7 in which an inorganic base capable of forming an insoluble sulfite is added to the organic extractant after stripping to recover sulfur dioxide as a sulfite and said sulfite is heated to regenerate sulfur dioxide.

9. The process of claim 8 in which the base is lime.

10. The process of claim 6 in which the organic extractant is selected from the group consisting of secondary and tertiary amines.

11. In a process for the recovery of an acid selected from the group consisting of sulfuric and phosphoric acids from solutions thereof which comprises the steps of:
   extracting the acid from a solution with a substantially water immiscible organic extractant medium and stripping said acid from said extractant with a stripping agent;
   the improvement comprising:
      using a stripping agent comprising water containing sulfur dioxide in at least an amount substantially approaching that required to saturate the water at about 50° C.;
      recovering the sulfur dioxide from the stripped acid and the extractant; and recycling the regenerated extractant and the sulfur dioxide for reuse in the process.

12. The process of claim 11 wherein sulfur dioxide is recovered from the extractant by adding an inorganic base capable of forming an insoluble sulfite to the extractant to recover sulfur dioxide as a sulfite and heating said sulfite to regenerate sulfur dioxide.

13. The process of claim 11 wherein said extractant is selected from the group consisting of secondary and tertiary amines and the sulfur dioxide is recovered by heating the extractant.

14. The process of claim 11 in which the sulfur dioxide is recovered from the stripped organic extractant by heating the extractant.

References Cited

UNITED STATES PATENTS

| | | | |
|---|---|---|---|
| 1,929,442 | 10/1933 | Milligon | 23—165 |
| 2,811,415 | 10/1957 | Seaborg | 23—102 X |
| 2,842,424 | 7/1958 | Schornstein et al. | 23—87 X |

(Other references on following page)

| | | | |
|---|---|---|---|
| 2,885,265 | 5/1959 | Cunningham | 23—165 |
| 2,955,019 | 10/1960 | Dickert et al. | 23—102 X |
| 3,072,461 | 1/1963 | Long et al. | 23—165 |

OTHER REFERENCES

Coleman et al., Proceedings of International Conference on Peaceful Uses of Atomic Energy, vol. 28, 1958, pages 278–288.

Moore, Analytical Chemistry, vol. 29, No. 11, November 1957, pages 1660–1662.66

Smith et al., Journal of the Society of Chemical Industry, vol. 67, No. 2, February 1948, pages 48–51.

OSCAR R. VERTIZ, *Primary Examiner.*

H. T. CARTER, *Assistant Examiner.*

UNITED STATES PATENT OFFICE
CERTIFICATE OF CORRECTION

Patent No. 3,333,924                          August 1, 1967

Wayne C. Hazen et al.

It is hereby certified that error appears in the above numbered patent requiring correction and that the said Letters Patent should read as corrected below.

Column 1, line 19, for "organic" read -- inorganic --.

Signed and sealed this 25th day of June 1968.

(SEAL)
Attest:

Edward M. Fletcher, Jr.

Attesting Officer

EDWARD J. BRENNER

Commissioner of Patents